United States Patent [19]

Konno et al.

[11] Patent Number: 5,253,429
[45] Date of Patent: Oct. 19, 1993

[54] LEVELLING METHOD AND APPARATUS

[75] Inventors: Yoshishige Konno; Yooichi Toita; Chihiro Marumo, all of Kawasaki, Japan

[73] Assignee: Mitutoyo Corporation, Tokyo, Japan

[21] Appl. No.: 845,198

[22] Filed: Mar. 3, 1992

[30] Foreign Application Priority Data

Mar. 7, 1991 [JP] Japan .................. 3-068005

[51] Int. Cl.⁵ .................. B23Q 3/04; B23Q 15/26
[52] U.S. Cl. .................. 33/568; 33/573; 33/569; 33/1 M
[58] Field of Search .......... 33/573, 568, 569, 1 M

[56] References Cited

U.S. PATENT DOCUMENTS

| | | | |
|---|---|---|---|
| 1,033,921 | 7/1912 | Morton | 33/568 |
| 1,521,341 | 12/1924 | Thacher | 33/569 |
| 2,676,414 | 4/1954 | Derry | 33/569 |
| 3,058,226 | 10/1962 | Michael | 33/568 |
| 3,829,978 | 8/1974 | Basin et al. | 33/568 |
| 4,118,869 | 10/1978 | Hartung et al. | 33/568 |
| 4,570,343 | 2/1986 | Bell | 33/568 |
| 4,575,942 | 3/1986 | Moriyama | 33/568 |
| 4,941,265 | 7/1990 | Heiland | 33/568 |
| 5,068,972 | 12/1991 | Herzog et al. | 33/568 |

*Primary Examiner*—William A. Cuchlinski, Jr.
*Assistant Examiner*—C. W. Fulton
*Attorney, Agent, or Firm*—Oliff & Berridge

[57] ABSTRACT

A levelling apparatus utilizes a control system for obtaining the average plane of an object placed on a mounting member from the coordinates of at least three points in a specified area of the object including points which are not on the same straight line and for instructing supporting system for supporting the mounting member to control the average plane so as to have the desired attitude. In this way, three-dimensional attitude control of the object is enabled.

5 Claims, 13 Drawing Sheets

LEVELLING METHOD AND APPARATUS

BACKGROUND OF THE INVENTION

1. Field of the Invention

The present invention relates to a levelling method and apparatus and, more particularly, to the improvement in a levelling method and apparatus for levelling an object of which the surface shape or surface roughness is to be measured.

2. The Related Art

Levelling apparatuses for controlling an object which is placed on a mounting member so as to have the desired attitude are known and they are generally used to place an object of measurement, a work, etc. on the mounting members of a surface roughness tester, a three-dimensional measuring apparatus and various working machines.

In the case of a surface roughness tester, for example, if the measuring plane is inclined, the base line is inclined in the result of measurement, as shown in FIG. 15 (A), which is unsuitable for obtaining the data on the surface roughness. Furthermore, if a measurable allowance must be set at a wide range in the case as shown in FIG. 15(A), the discrimination of the measurement is impaired. It is therefore necessary to adjust the mounting attitude so as to level in the direction of scanning by the probe (see FIG. 15(B)).

In the case of outputting the surface roughness three-dimensionally by measuring it several times by feeding the probe little by little in the direction orthogonal to the direction of scanning by the probe, the levelling in the direction orthogonal to the direction of scanning constitutes a very important precondition.

In a conventional levelling apparatus, however, the levelling only in one direction is automatized, and no levelling apparatus which is capable of automatic three-dimensional attitude control of an object placed on a mounting member has ever been produced.

As a result, the three-dimensional attitude of an object placed on the mounting member must be adjusted manually, which takes much labor and time.

SUMMARY OF THE INVENTION

Accordingly, it is an object of the present invention to eliminate the above-described problems in the related art and to provide a levelling apparatus which is capable of three-dimensional attitude control of an object which is placed on a mounting member.

To achieve this aim, the present invention provides a levelling apparatus comprising: a mounting member for mounting an object thereon; a supporting means for supporting the mounting member in such a manner as to have a variable inclination with respect to a base; and a control means for obtaining the average plane of the surface of the object placed on the mounting member from the coordinates of at least three points in a specified area of the object which are not on the same straight line and for instructing the supporting means to control the average plane so as to have the desired attitude.

The supporting means is disposed between the base and the mounting member and includes three supporting portions which are not on the same straight line. It is preferable that a first supporting portion supports the base and the mounting member with a substantially constant space therebetween and the mounting member is allowed only spacial rotation without rotation around an axis which is vertical to the base and that second and third supporting portions support the base and the mounting member with a variable space therebetween.

It is also preferable that the second and third supporting portions are disposed at the vertices of the base of an isosceles triangle with the first supporting portion as the apex, and that the control means obtains the displacement $\Delta Z_p$ of the space between the base and the mounting member at the second supporting portion and the displacement $\Delta Z_q$ of the space between the base and the mounting member at the third supporting portion from the following equations:

$$\Delta Z_p = \lambda x_0 - \mu y_0$$

$$\Delta Z_q = \lambda x_0 - \mu y_0$$

wherein $(\lambda, \mu, \nu)$ represents the direction cosine vector of the average plane of the object placed on the mounting member, $x_0$ the distance of the perpendicular between the first supporting portion and the straight line connecting the second and third supporting portions, and $y_0$ half the distance between the second supporting portion and the third supporting portion.

It is preferable that the first supporting portion of the supporting means is provided with two pairs of balls which rotate around the respective axes which do not coincide with the line conducting two portions for supporting the base and the mounting member and which are orthogonal to each other.

It is also preferable that the first supporting portion of the supporting means is provided with a pair of axial bodies which rotate around the respective axes which do not coincide with the line connecting two portions for supporting the base and the mounting member and which are orthogonal to each other.

The present invention also provides a levelling method comprising an average plane detecting step and a position controlling step. In the average plane detecting step, the average plane of the object placed on the mounting member is detected. In a position regulating step, supporting means for supporting the object placed on the mounting member is preferably so controlled that the direction cosine vector of the average surface is coincident with the desired cosine vector.

The above and other objects, features and advantages of the present invention will become clear from the following description of the preferred embodiments thereof, taken in conjunction with the accompanying drawings.

DESCRIPTION OF THE PREFERRED EMBODIMENT

Preferred embodiments of the present invention will be explained hereinunder with reference to the accompanying drawings.

Figure 1:
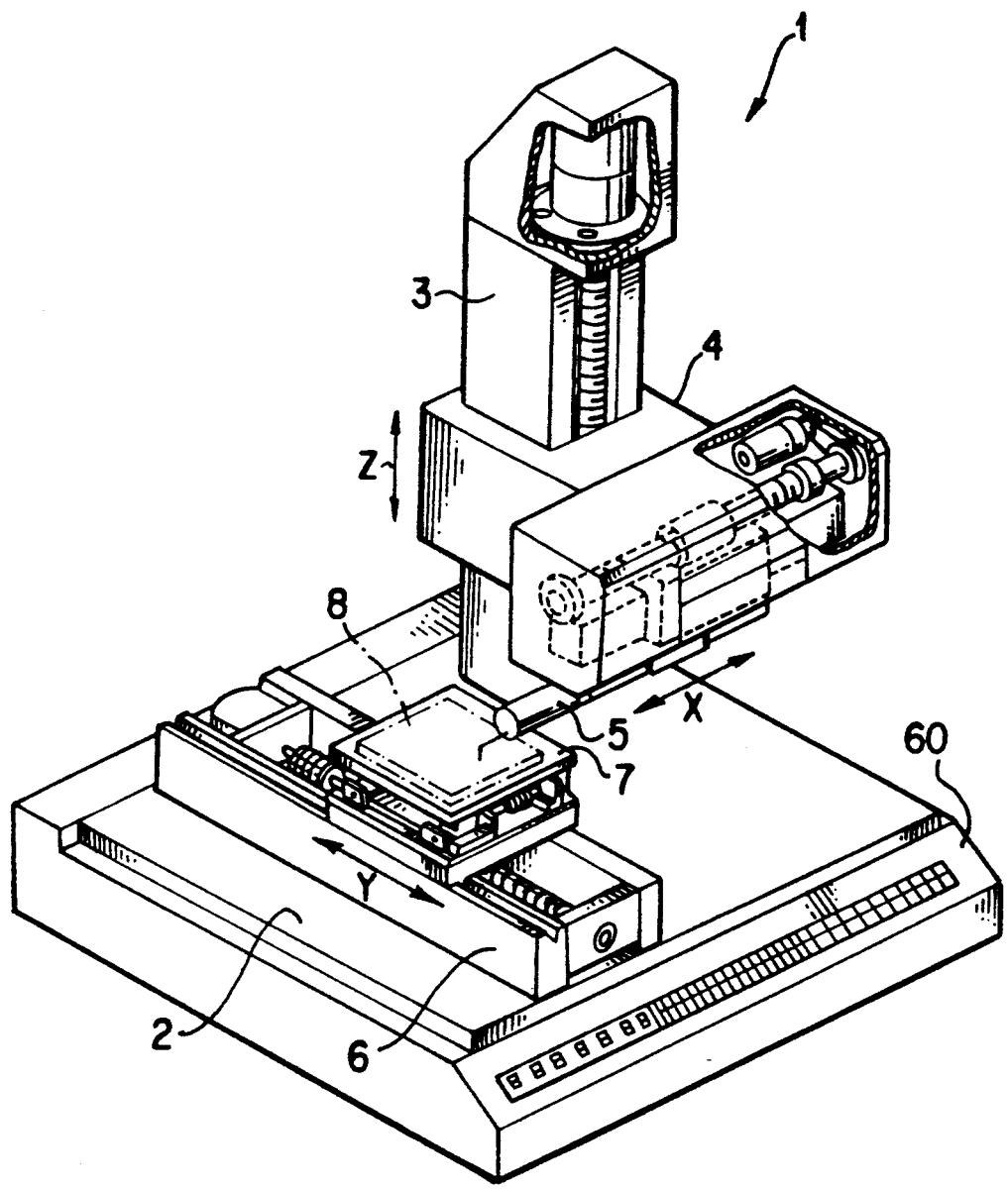
FIG. 1 is a perspective view of the external appearance of a surface roughness tester to which a first embodiment of a levelling apparatus according to the present invention is applied.

FIG. 1 is a perspective view of the external appearance of a surface roughness tester to which a first embodiment of a levelling apparatus according to the present invention is applied.

A surface roughness tester 1 shown in FIG. 1 is composed of a base 2, a support 3 erected on the base 2, an arm 4 vertically (in the direction of Z) slidably provided on the support 3, a detector 5 provided on the arm 4 in such a manner as to be slidable in the direction of X, and a slider 6 for supporting an object of measurement in such a manner as to be slidable in the direction of Y.

A levelling apparatus 7 as a first embodiment of the present invention is placed on the slider 6.

The levelling apparatus 7 three-dimensionally levels an object 8 of measurement placed on the levelling apparatus 7. The slider 6 together with the levelling apparatus 7 sets the position of the object 8 in the direction of Y, and the position of the arm 4 in the direction of Z is adjusted, thereby positioning the detector 5 in the measuring plane of the object 8. By scanning the measuring plane of the object 8 in the direction of X by the detector 5, the output of the surface roughness of the object 8 is obtained three-dimensionally.

Figure 2:
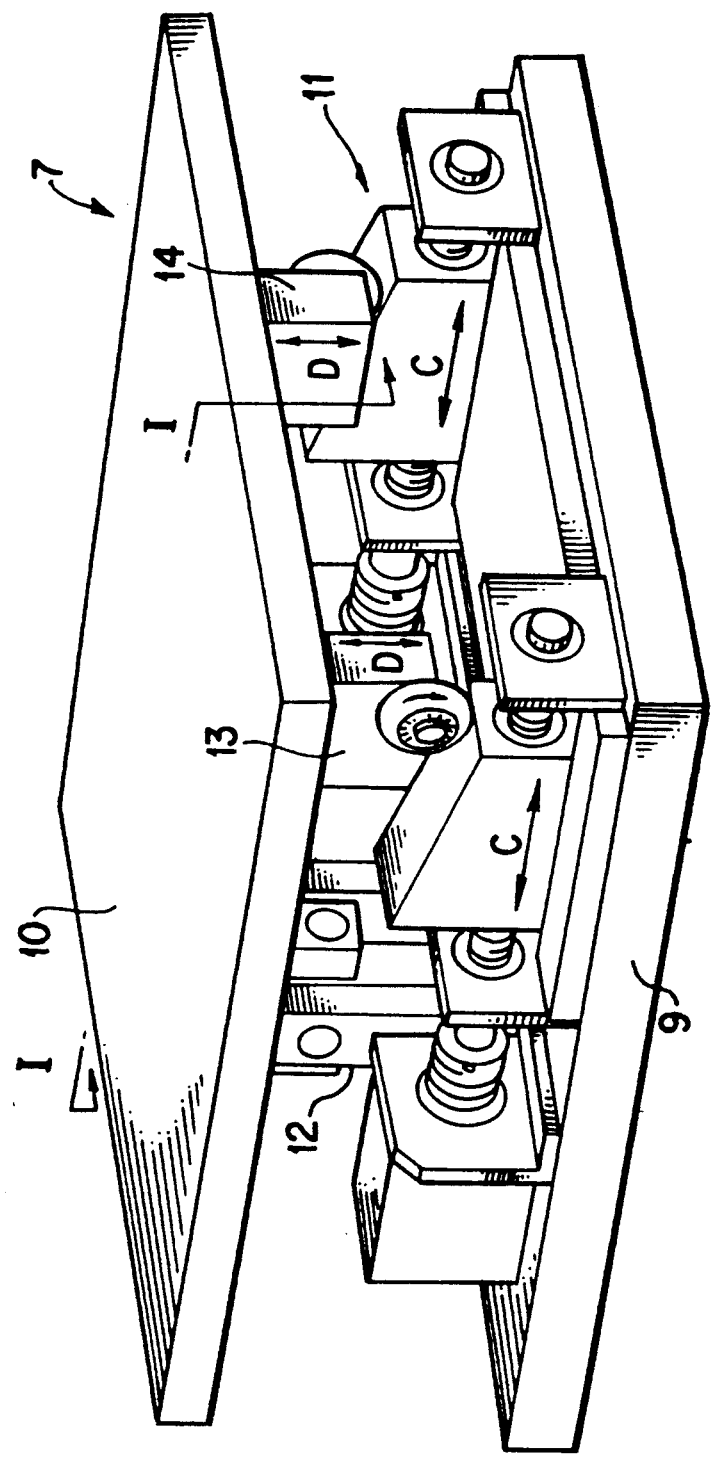
FIG. 2 is a perspective view of the external appearance of the levelling apparatus shown in FIG. 1.

FIG. 2 is a perspective view of the external appearance of the levelling apparatus 7 of this embodiment. As is obvious from FIG. 2, the levelling apparatus 7 is composed of a base 9, a mounting member 10, and a supporting means 11 disposed between the base 9 and the mounting member 10.

The supporting means is composed of three supporting portions 12, 13 and 14. By vertically moving the positions at which the mounting member 10 is supported by the supporting members 13, 14, the three-dimensional attitude of the mounting member 10 with respect to the base 9 is varied as desired.

Figure 3:
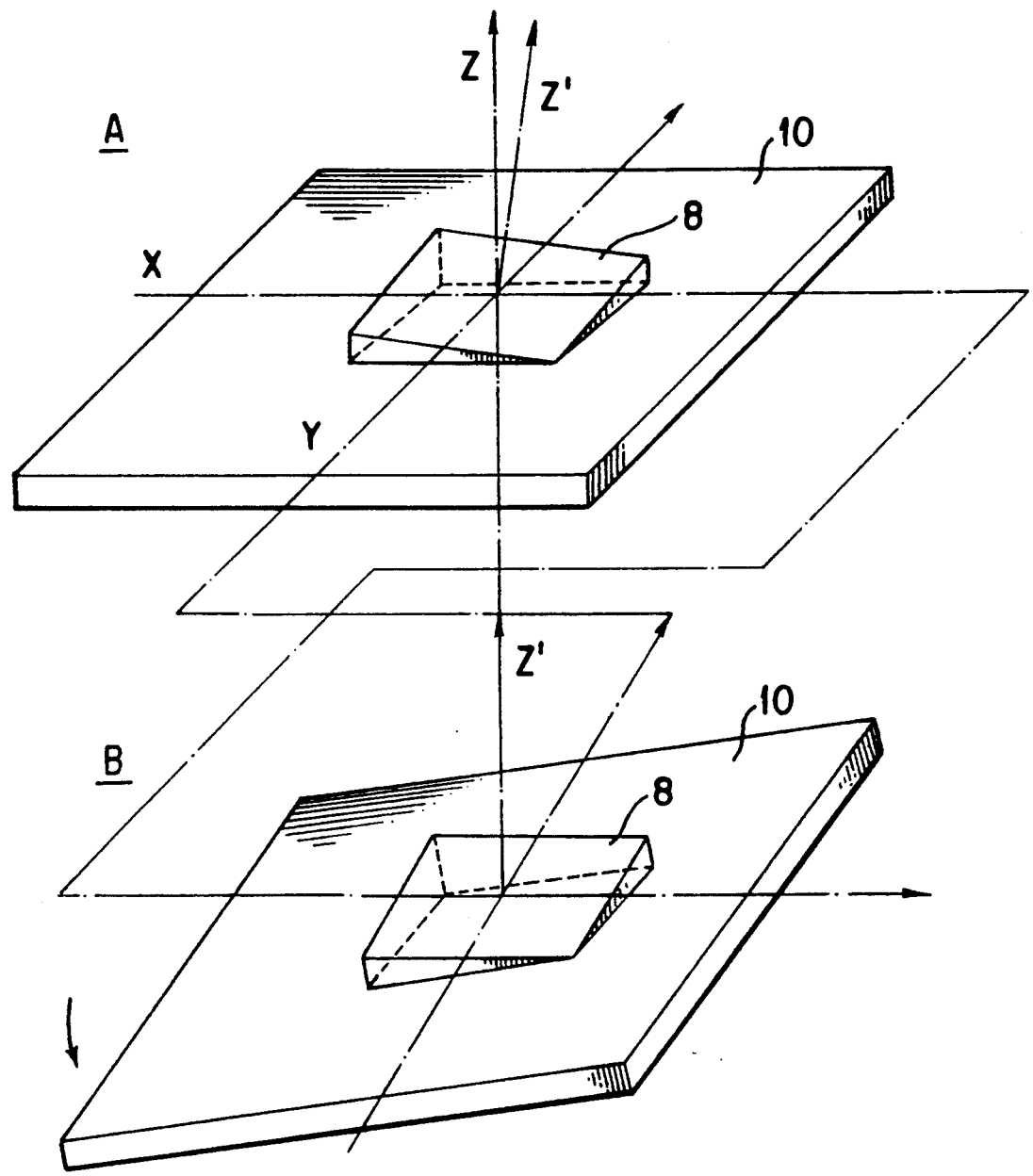
FIGS. 3(A) and 3(B) are explanatory views of the concept of the attitude control mechanism of a levelling apparatus according to the present invention.

FIGS. 3(A) and 3(B) schematically show the three-dimensional attitude control of the object 8 of measurement by the levelling apparatus 7 shown in FIG. 2.

As shown in FIG. 3(A), when the object 8 of measurement having a three-dimensional inclination is placed on the mounting member 10, the coordinate axes of the object 8 in the measuring plane with respect to the standard coordinate axis is represented by the one-dot chain line Z', respectively.

In the present invention, the three-dimensional attitude of the mounting member 10 is changed in accordance with the information on the measuring plane of the object 8 of measurement so that the coordinate axis Z' agrees with the standard coordinate axis Z, as shown in FIG. 3(B).

The three-dimensional levelling of the object 8 of measurement is substantially enabled by making the Z' axis coincident with the Z axis.

Figure 4:
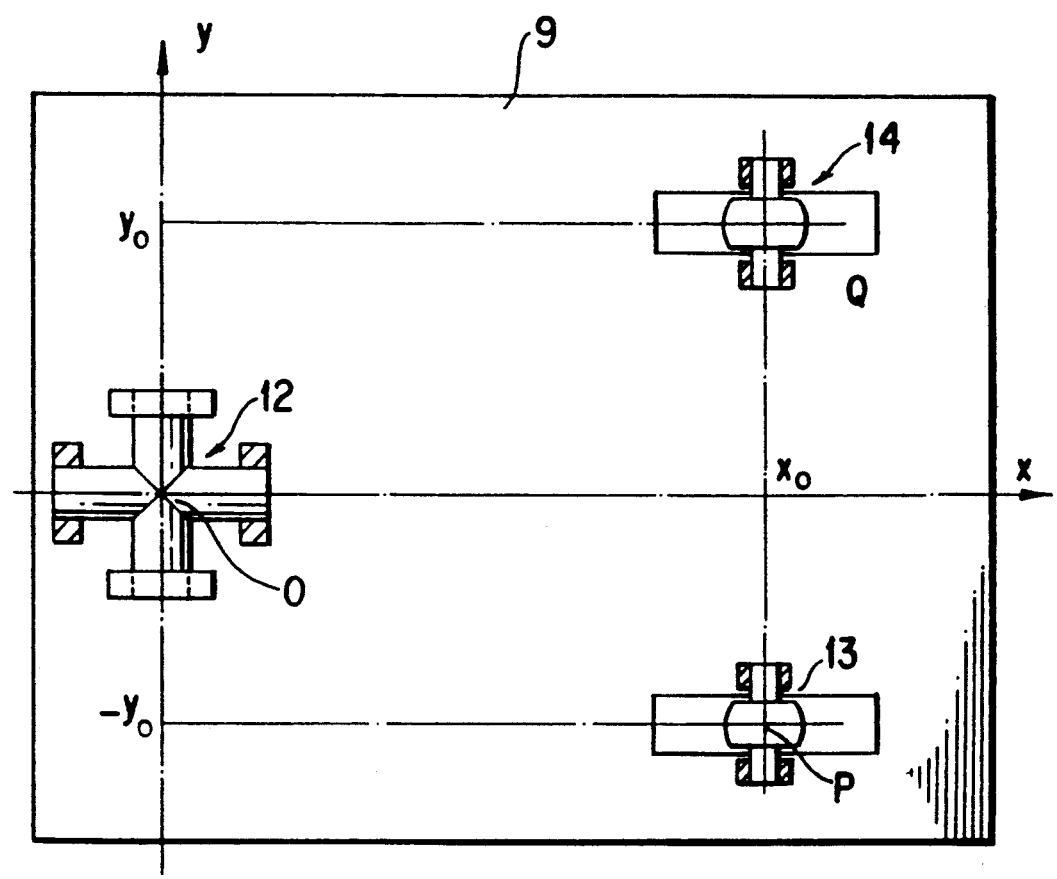
FIG. 4 shows the arrangement of the three supporting portions of the levelling apparatus shown in FIG. 2.

In this embodiment, the supporting means 11 is disposed as shown in FIG. 4.

FIG. 4 is a plan view of the levelling apparatus 7 of this embodiment with the mounting member 10 removed therefrom. The supporting portion 12 supports the mounting member 10 at the point 0 in such a manner as to allow only the spatial rotation without rotation around the axis Z, and the supporting portions 13, 14 supports the mounting member 10 in such a manner as to allow only the vertical movement (in the direction of Z) independently of each other.

Figure 5:
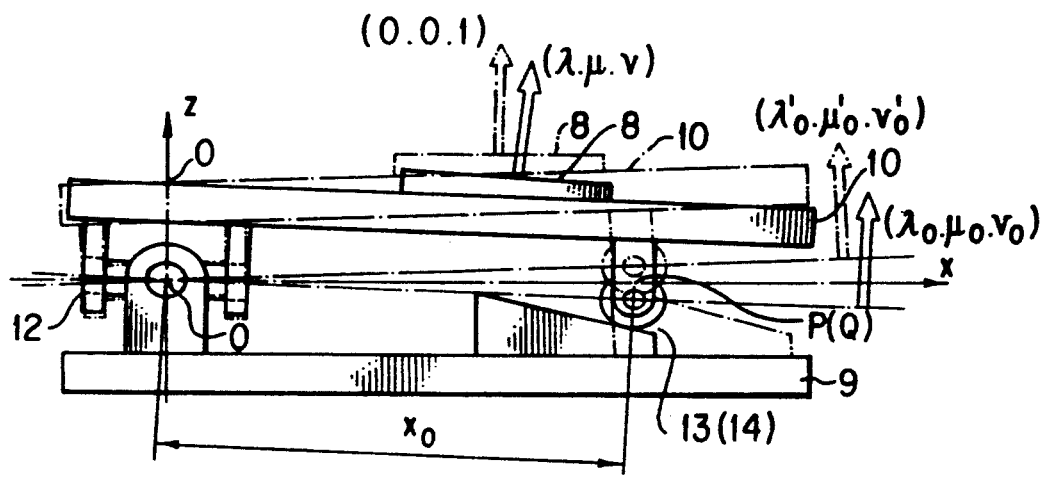
FIGS. 5 and 6 are explanatory views of the object placed on the mounting member in the state of the attitude thereof being controlled.
Figure 6:
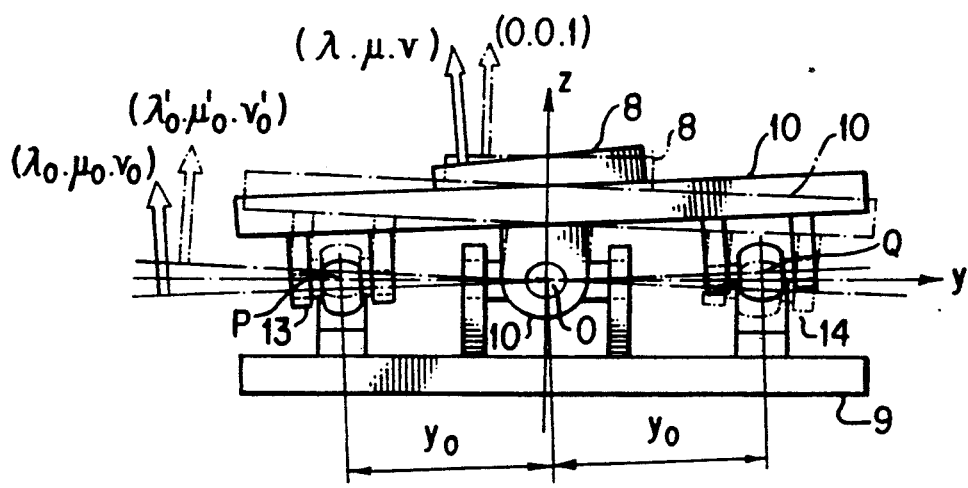

It is therefore possible to adjust the levelling of the mounting member 10 around the axis Y and around the axis X by vertically moving the points P and Q of the supporting portions 13 and 14, respectively, as shown in FIGS. 5 and 6, respectively.

More specifically, an average plane which is assumed on the surface of the object 8 of measurement is obtained from the coordinates of not less than three points (X, Y, Z) of the object 8 which are not on the same straight line. The average plane is represented by $Z = a + bX + cY$. The coefficients b and c are obtained from the coordinates X, Y and Z by a least square method. From these coefficients, and of the normal unit vector components of the average surface in the direction of X, Y and Z are obtained in accordance with the following equations:

$$\lambda = \frac{-b}{(b^2 + c^2 + 1)^{\frac{1}{2}}}$$

$$\mu = \frac{-c}{(b^2 + c^2 + 1)^{\frac{1}{2}}}$$

Making the average plane perpendicular to the Z-axis is equivalent to changing the direction cosine vector of the average surface of the object 8 into (0, 0, 1). If it is assumed that the cosine vector of the mounting member 10 in the direction of the surface is $(\lambda_0, \mu_0, \nu_0)$, in the case of realizing this change by moving the two points P and Q of the supporting portions 13 and 14 in the direction of Z, the displacements $\Delta Z_p$ and $\Delta Z_q$ at the respective points are obtained from the following equations:

$$\nu Z_p = \frac{\nu_0 \lambda + \lambda_0 (1 - \nu)}{(1 - \mu_0^2)^{\frac{1}{2}}} \cdot$$

$$x_0 + \frac{(\lambda_0 \lambda + \mu_0 \mu + \nu_0 \nu - \nu_0)\mu_0 - \mu}{(1 - \mu_0^2)^{\frac{1}{2}}} \cdot y_0$$

$$\Delta Z_q = \frac{\nu_0 \lambda + \lambda_0 (1 - \nu)}{(1 - \mu_0^2)^{\frac{1}{2}}} \cdot$$

$$x_0 + \frac{(\lambda_0 \lambda + \mu_0 \mu + \nu_0 \nu - \nu_0)\mu_0 - \mu}{(1 - \mu_0^2)^{\frac{1}{2}}} \cdot y_0$$

wherein $x_0$ represents the distance of the X-axis between the point O to the middle point of the given straight line PQ, and $y_0$ represents the distance between the middle point to the point P or Q (see FIGS. 4 to 6).

However, since it is generally difficult to grasp $\lambda_0, \mu_0, \nu_0$), if the angle between (0, 0, 1) and ($\lambda_0, \mu_0, \nu_0$) is sufficiently small (e.g., not more than 2 degrees), $\Delta Z_p$ and $\Delta Z_q$ may be expressed by the following formulas on the assumption that ($\lambda_0, \mu_0, \nu_0$)$\approx$(0, 0, 1) without any problem in practical use:

$$\Delta Z_p \approx \lambda x_0 - \mu Y_0$$

$$\Delta z_q \approx \lambda x_0 + \mu Y_0$$

Accordingly, it is possible to calculate the displacements $\Delta Z_p$ and $\Delta Z_q$ of the supporting points P and Q, respectively, in the direction of Z from the Values $\theta$ and $\mu$ which have been actually measured in preparatory measurement so as to obtain the average plane of the object 8 of measurement.

As described above, according to the levelling apparatus of this embodiment, automatic three-dimensional attitude control (three-dimensional levelling) is enabled by obtaining the average plane of the object 8 of measurement by preparatory measurement, and adjusting the heights of the supporting portions 13, 14 so that the direction cosine vector ($\lambda, \mu, \nu$) of the average plane is changed into 0, 0, 1).

The supporting means of the levelling apparatus of this embodiment will now be explained in detail with reference to FIGS. 7 to 10.

Figure 7:
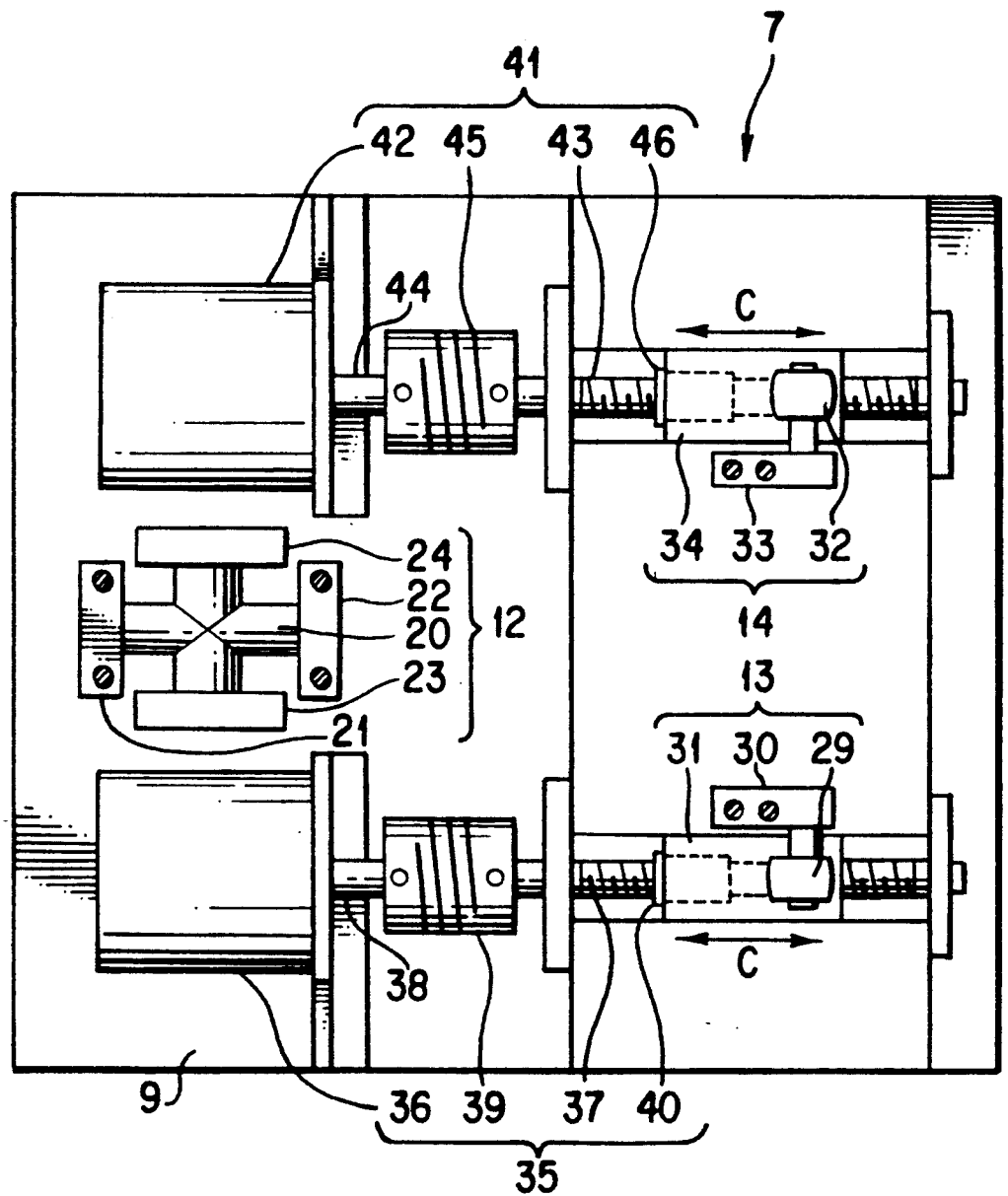
FIG. 7 is a plan view of the levelling apparatus shown in FIG. 2 with the mounting member removed therefrom.

FIG. 7 shows the levelling apparatus 7 of this embodiment with the mounting member 10 removed therefrom. In FIG. 7, the supporting means 11 is composed of the three supporting portions 12, 13 and 14 and supports the mounting member 10 in the desired attitude with respect to the base 9.

Figure 8:
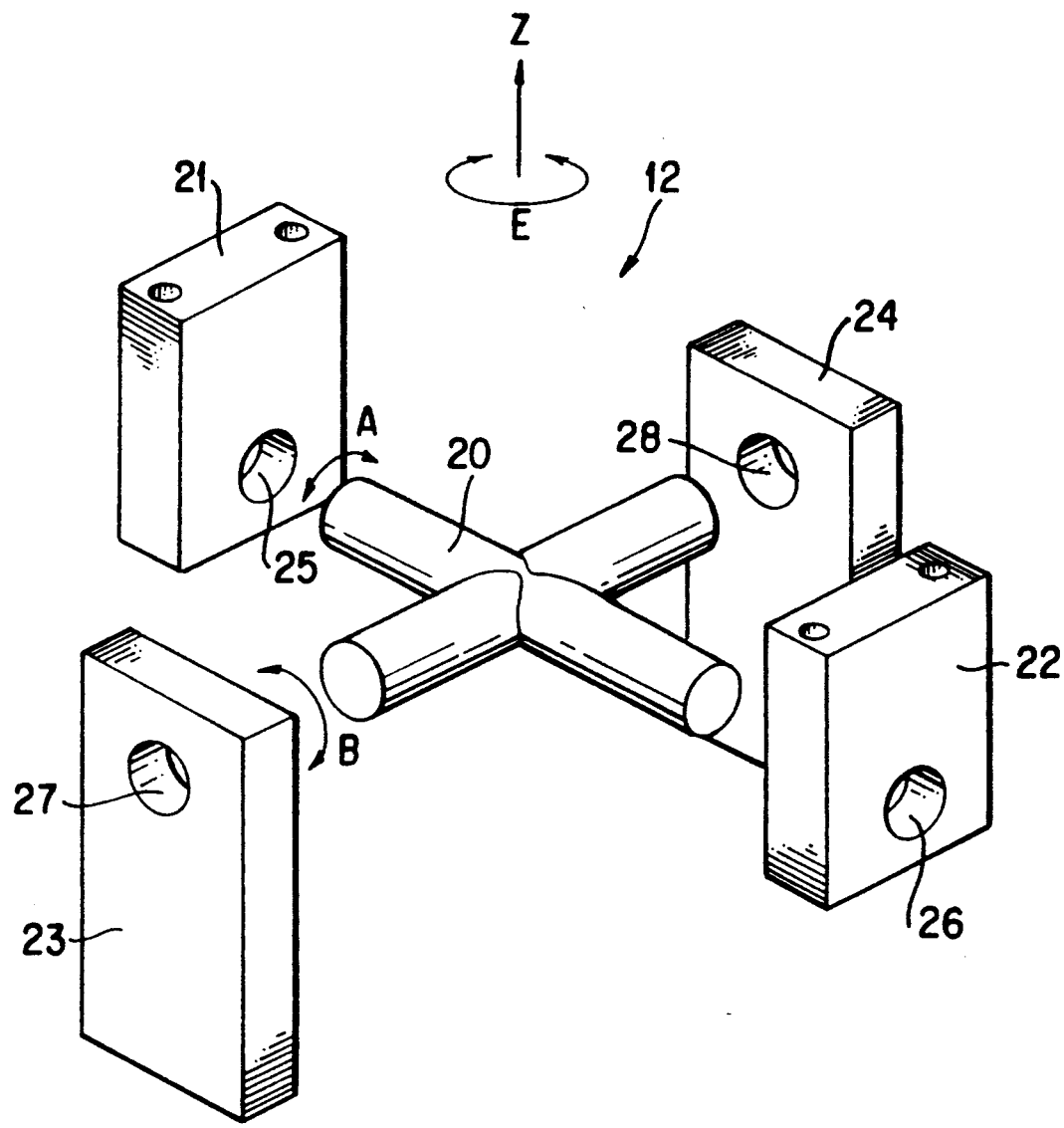
FIG. 8 is an exploded perspective view of the main part of the first supporting portion of the levelling apparatus shown in FIG. 2.
Figure 9:
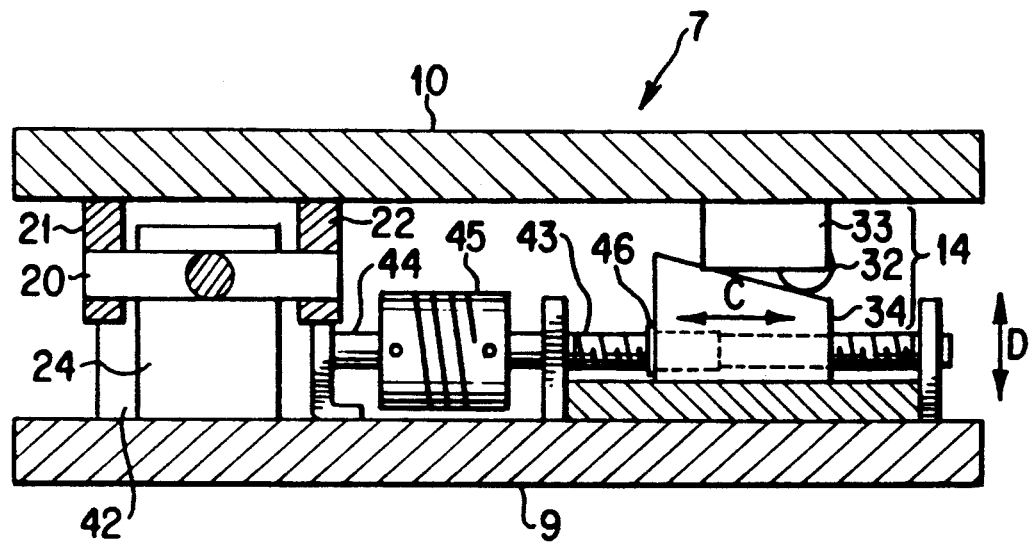
FIG. 9 is a sectional view of the levelling apparatus shown in FIG. 2, taken along the line I—I.

FIG. 8 shows an exploded perspective view of the main part of the first supporting portion 12. As is obvious from FIG. 8, the first supporting portion 12 is composed of a rotary member 20 consisting of two rods having the same shape and orthogonal to each other, supporting members 21, 22 for supporting the rotary member 20 so as to be rotatable in the direction indicated by the arrow A, and supporting members 23, 24 for supporting the rotary member 20 so as to be rotatable in the direction indicated by the arrow B. The supporting members 21, 22 are fixed to the under surface of the mounting member 10 by screws and the supporting members 23, 24 are fixed to the upper surface of the base 9 by screws. In this manner, the first supporting portion 12 supports the mounting member 10 with respect to the base 9 while keeping a constant space therebetween. The supporting members 21, 22, 23 and 24 are provided with holes 25, 26, 27 and 28, respectively, for rotatably supporting the rotary member 20.

The second and third supporting portions 13, 14 have an approximately similar structure. The details thereof will be explained with reference to a sectional view and a side elevational view thereof shown in FIGS. 9 and 10, respectively.

Figure 10:
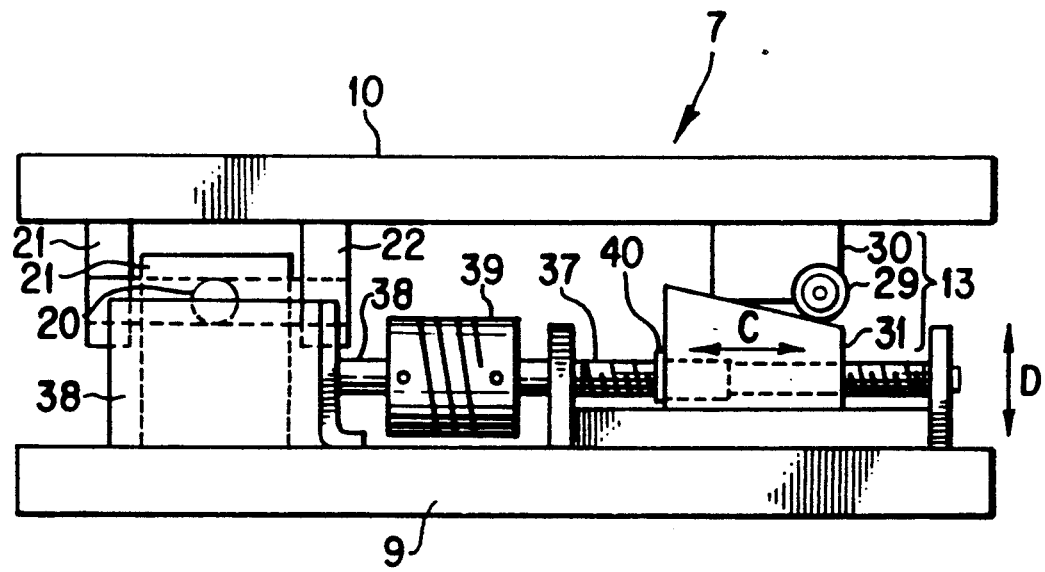
FIG. 10 is a side elevational view of the levelling apparatus shown in FIG. 2.

The second supporting portion 13 is composed of a spherical roller 29, a supporting member 30 for rotatably supporting the spherical member 29, and a slider 31 with which the spherical roller 29 is rotatably engaged, as shown in FIG. 10. The supporting member 30 is fixed on the under surface of the mounting member 10, and the slider 31 is disposed on the upper surface of the base 9 so as to be movable in the direction indicated by the arrow C. Accordingly, the second supporting portion makes the space between the base 9 and the mounting member 10 variable and, since the position at which the slider 31 engages the spherical roller 29 is freely changed, the second supporting portion 13 supports the mounting member 10 with respect to the base 10 so as to be movable in the direction indicated by the arrow D.

Similarly to the second supporting portion 13, the third supporting portion 14 is composed of a spherical roller 32, a supporting member 33 for rotatably supporting the spherical member 32, and a slider 34 with which the spherical roller 32 is rotatably engaged.

These three supporting portions 12, 13 and 14 are arranged so that an isosceles triangle is constituted with the first supporting portion 12 as the apex. The length of the base of the isosceles triangle, i.e., the distance between the second and third supporting portions 13, 14 is 2 $Y_o$ and the altitude of the isosceles triangle, i.e., the distance between the first supporting portion 12 and the line connecting the second and third supporting portions 13, 14 is Xo.

The surfaces of both sliders 31, 34 which engage the spherical rollers 29 and 32, respectively, have an inclination of 15 degrees with respect to the respective bases.

The second supporting portion 13 is provided with a space varying means 35 which is composed of a motor 36 as a driving means, a screw rod 37, the driving shaft 38 of the motor 36, a joint 39 for connecting the driving shaft 38 of the motor 36 and the screw rod 37, and a bush 40. The motor 36 is fixed to the base 9 and the screw rod 40 is screwed into the bush 40. The bush 40 is fixed to the slider 31.

Consequently, when the motor 36 is driven, the space varying means 35 can slide the slider 31 in the direction indicated by the arrow C. With the sliding motion of the slider 31, the supporting member 30 moves vertically, namely, in the direction indicated by the arrow D in FIG. 10, so that the distance between the base 9 and the mounting member 10 supported by the second supporting portion 13 is changed.

A space varying means 41 of the third supporting portion 14 has the same structure. The space varying means 41 is composed of a motor 42, a screw rod 43, a driving shaft 44, a joint 45, and a bush 46. When the motor 42 is driven, the slider 34 is moved in the direction indicated by the arrow C, and the distance between the base 9 and the mounting member 10 supported by the second supporting portion 14 is changed.

Each of the motors 36, 42 is composed of a stepper motor which makes one turn at 1,000 steps. Each of the screw rods 37, 43 is provided with threads with a pitch which moves the bush 40 (46) by 0.5 mm in the direction indicated by the arrow C when the screw rod 37 (43) makes one turn.

The control means of the levelling apparatus of this embodiment will now be explained.

Figure 11:
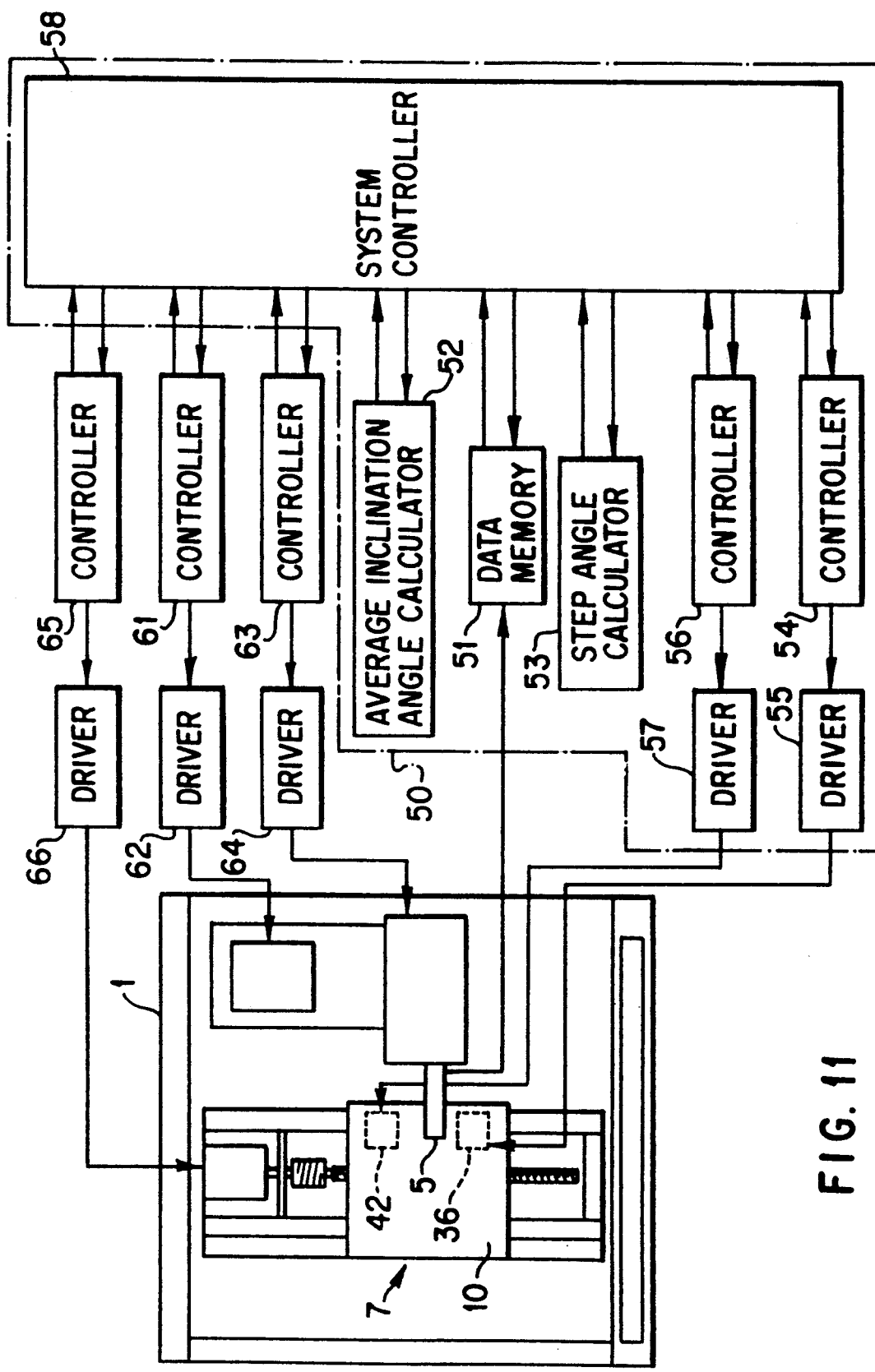
FIG. 11 is an explanatory view of the control means of the levelling apparatus shown in FIG. 2.

As shown in FIG. 11, a control means 50 is composed of a data memory 51 for temporarily storing the output of the detector 5, an average inclination angle calculator 52 for calculating the inclination angle of the object 8 of measurement from the coordinates of the surface of the object 8 which are stored in the data memory 51, a step angle calculator 53 for calculating the step angles of the motors 36 and 42 from the average inclination angle, a controller 54 and a driver 55 for controlling the driving of the motor 36 on the basis of the output of the step angle calculator 53, and a controller 56 and a driver 57 for controlling the driving of the motor 42 on the basis of the output of the step angle calculator 53.

The control means 50 is synthetically controlled by a system controller 58.

The operation of the levelling apparatus of this embodiment having the above-described structure will now be explained.

In FIG. 1, the operator operates an operation/display panel 60 of the surface roughness tester 1 so as to set the operation conditions for the surface roughness tester 1, for example, measuring range, sampling pitch, measuring length and operation interval.

The operator then turns on the autolevelling selection key by operating the operation/display panel 60.

The preparatory measuring conditions are then set for automatically correcting the inclination (attitude control) of the mounting member 10 mounting the object 8 of measurement thereon in accordance with the control by the system controller 58.

The inclination (attitude) of the object 8 of measurement placed on the levelling apparatus 7 is measured by the surface roughness tester 1.

The surface roughness tester 1 obtains the coordinates of the surface of the object 8 at least three points which are not on the same straight line by at least two operations at different positions in the measuring plane (upper surface) of the object 8. The average plane of the measuring plane is obtained on the basis of the thus-obtained coordinates of at least three points.

The inclination of the mounting member 10 is corrected so that the measuring plane of the object 8 is constantly horizontal.

It is not by using the data obtained through a filter or the like for removing a sway component but by using the real data which are supplied from the detector 5 that the surface roughness is measured for the purpose of correction of the inclination (attitude control) of the mounting member 10.

The preparatory measurement is carried out in the following manner.

In FIG. 11, the system controller 58 operates a Z-direction controller 61 and a motor driver 62 so as to lower the detector 5 until the stylus at the tip of the detector 5 comes into contact with the object 8 of measurement.

The system controller 58 then causes the detector 5 to scan the surface of the object 8 in the direction of X through an X-direction controller 63 and a motor driver 64 so as to detect the coordinates of the surface at the current Y-axis position.

The system controller 58 then operates a Y-direction controller 65 and a motor driver 66 so as to move the slider 6 by a distance Dy. The detector 5 scans the surface of the object 8 so as to detect the coordinates of the surface at a new Y-axis position. Similar operations are repeated N times and the coordinates of the surface are stored in the data memory 51.

The greater the number N of scans, the greater is the amount of data on the coordinates of the surface and the more accurate the levelling becomes.

The average inclination angle calculator 52 obtains the average plane of the measuring plane of the object 8 of measurement from the plurality of data on the coordinates of the surface which are stored in the data memory 51 as discrete data, and calculates the inclination angle of the object 8.

As described above, the inclination angle of the average plane is calculated as the direction cosine vector $(\lambda_0, \mu_0, \nu_0)$ of the mounting member 10, and the step angle calculator 53 calculates the step angle of the motors 36, 42 which correspond to the distances $\Delta Z_p$ and $\Delta Z_q$ of movement of the supporting portions 13 and 14, respectively, so that the direction cosine vector $(\lambda, \mu, \nu)$ of the average plane is changed into (0, 0, 1).

The system controller 58 then raises the detector 5 from the object 8 of measurement by, for example, 10 mm through a Z-direction controller 61 and a motor driver 62.

The system controller 58 drives the motors 36 and 42 in accordance with the results of calculation of the step angle calculator 53 through the controllers 54, 56 and the drivers 55, 57.

As a result, the space varying means 35 and 41 slide the sliders 31 and 34, respectively, in the direction indicated by the arrow C by predetermined distances. With these sliding operations, the spherical rollers 29 and 32 which engage the sliders 31 and 34, respectively, move in the direction indicated by the arrow D by predetermined distances, thereby changing the distances between the base 9 and the mounting member 10 at the positions at which the mounting member 10 is supported by the second and third supporting portions 13 and 14, respectively. On the other hand, the distance between the base 9 and the mounting member 10 is kept constant at the position at which the mounting member 10 is supported by the first supporting portion 12.

By changing the supporting state of the mounting member 10 by the three supporting portions 12, 13 and 14 in this way, the inclination of the mounting member 10 with respect to the base 9 is corrected (the attitude is controlled) and the measuring plane of the object 8 of measurement is levelled ( the attitude is controlled).

By repeating the levelling operation plural times, more accurate levelling (attitude control) is enabled.

During the operation of the levelling apparatus 7, when the space varying means 35 and 41 are driven, the force for rotating the mounting member 10 around the X-axis, Y-axis and Z-axis on the basis of the difference in the amount of driving between the space varying means 35 and 41 acts on the supporting members 21 and 22 of the first supporting portion 12. The supporting members 21 and 22 receive this force and rotate the rotary member 20 in the directions of A and B around the two axes of the rotary member 20 with respect to the supporting members 23 and 24, which are fixed on the base 9.

However, since the rotary member 20 is rotatably supported by the supporting members 23 and 24, which are fixed on the base 9, the rotary member 20 does not rotate in the direction indicated by the arrow E in the plane which is parallel to the base 9. Accordingly, neither the supporting members 21, 22, which support the rotary member 20, nor the mounting member 10 rotate in the direction of E. In other words, the base 9 does not rotate around the Z-axis with respect to the mounting member 10.

As a result, even if the inclination of the mounting member 10 with respect to the base 9 is corrected (the attitude is controlled), the position of the object 8 of measurement placed on the mounting member 10 is not changed with respect to the surface roughness tester 1 except for the attitude control.

As described above, according to the surface roughness tester 1 using the levelling apparatus 7 of this embodiment, automatic and accurate levelling of the surface to be measured is enabled and, hence, the accurate measurement of the three-dimensional surface roughness of the object 8 of measurement is enabled.

Figure 12:
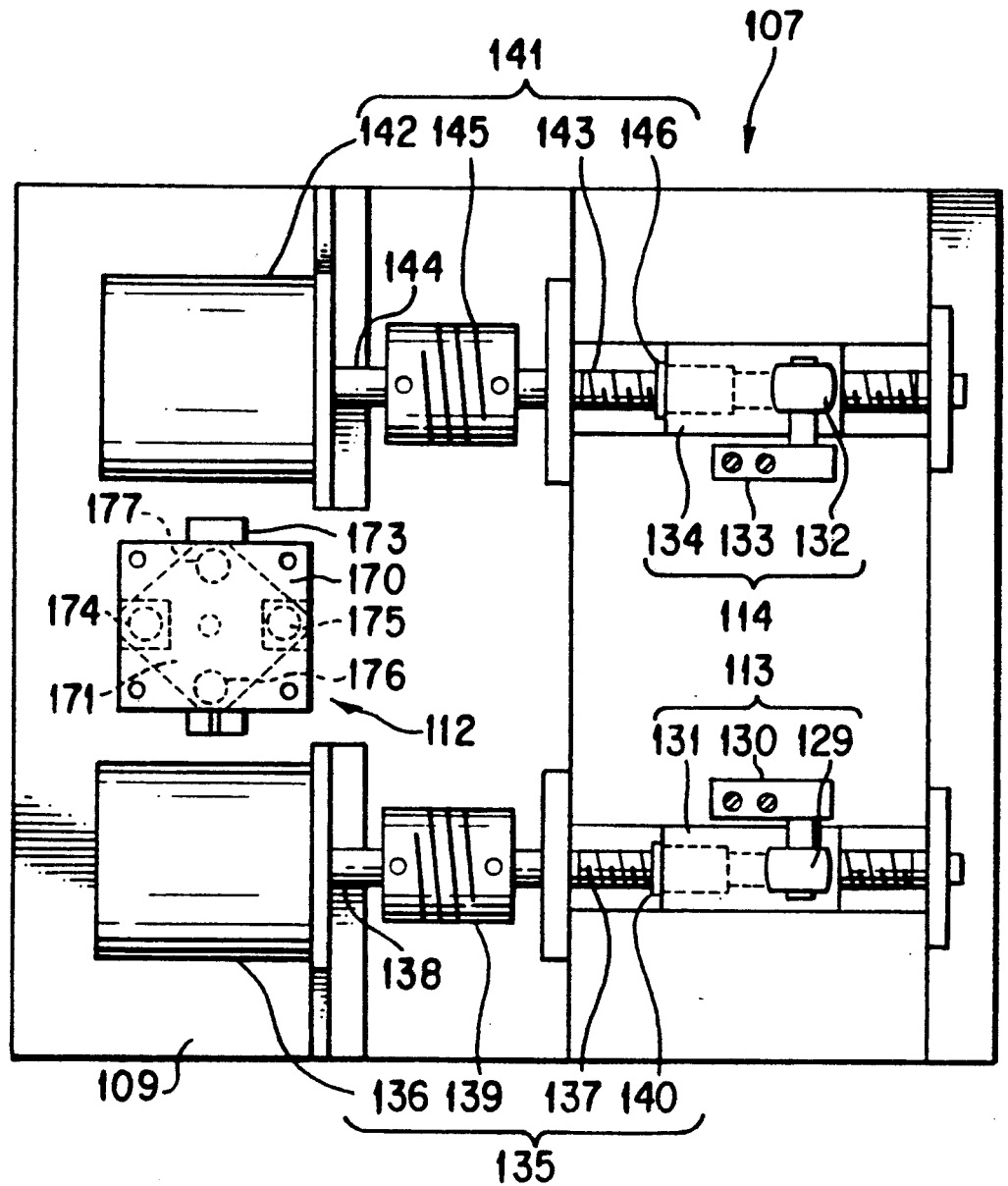
FIGS. 12 to 14 are explanatory views of the first supporting portion used in a second embodiment of a levelling apparatus according to the present invention.

Another embodiment of a levelling apparatus according to the present invention will be explained with reference to FIGS. 12 to 14. The elements which correspond to the elements in the first embodiment are indicated by the same numerals prefixed by the numeral 1 (in the case of two figures) or 10 (in the case of one figure) and explanation thereof will be omitted.

A levelling apparatus 107 has the same structure as the levelling apparatus 7 of the first embodiment except for a first supporting portion 112.

Figure 13:
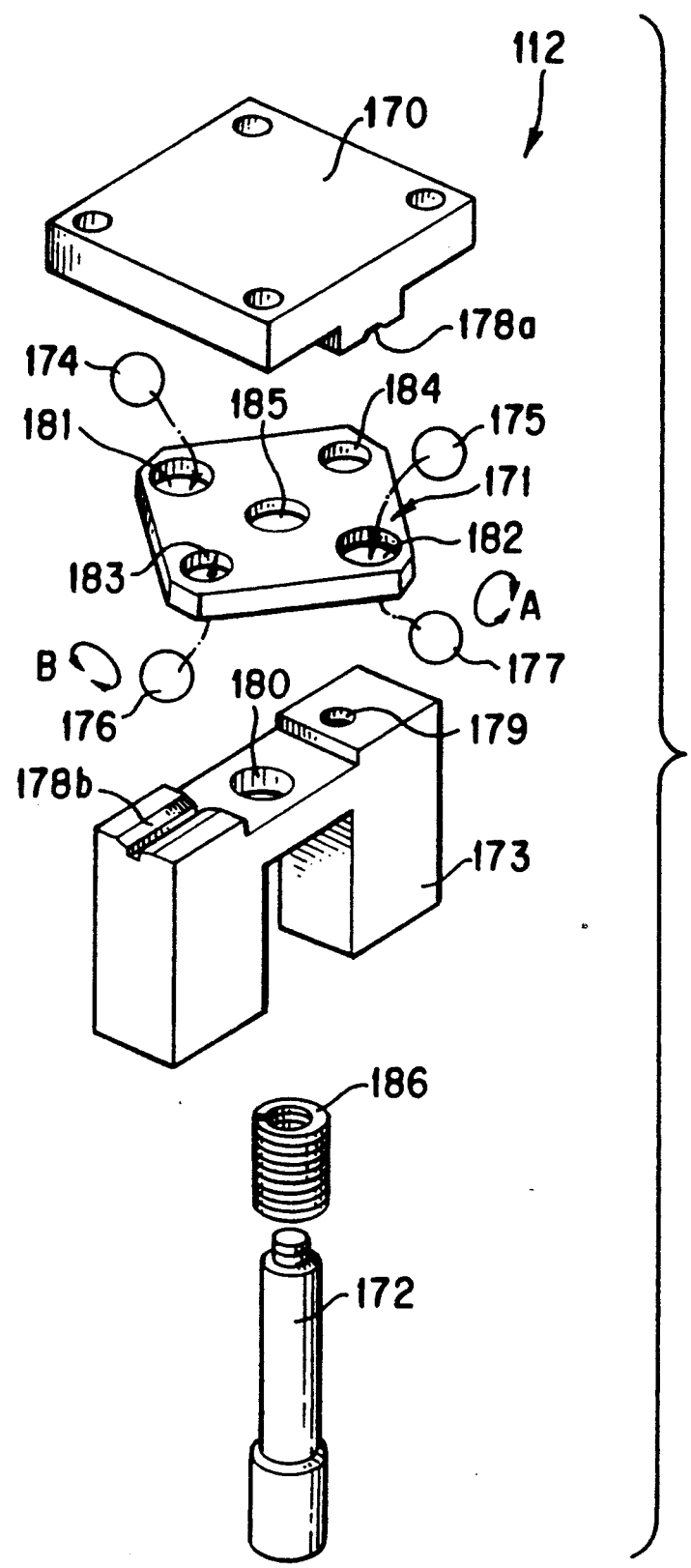
Figure 14:
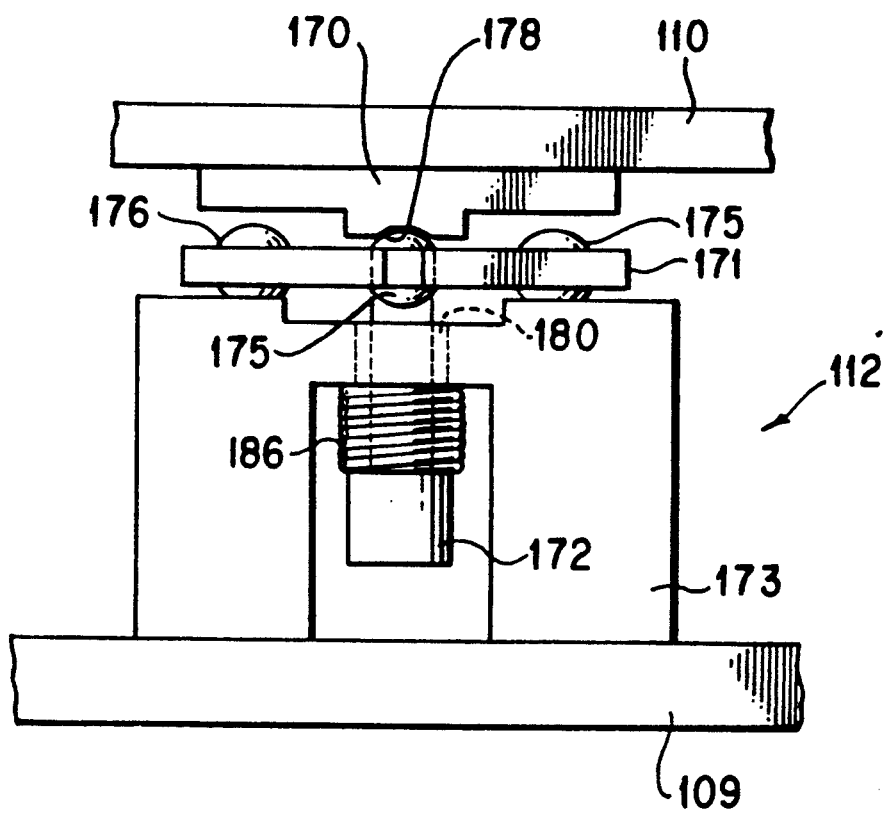
Figure 15A:
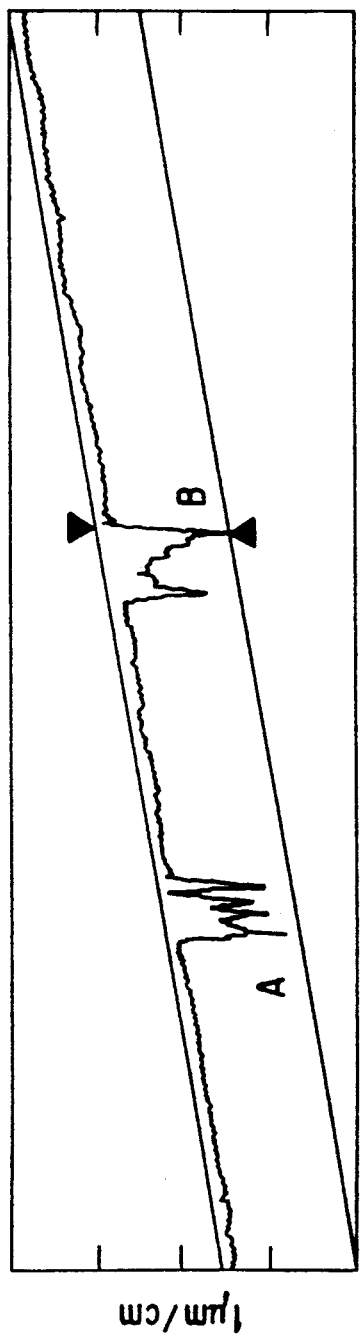
FIGS. 15a and 15b explains the necessity of the three-dimensional attitude control in a surface roughness tester.
Figure 15B:
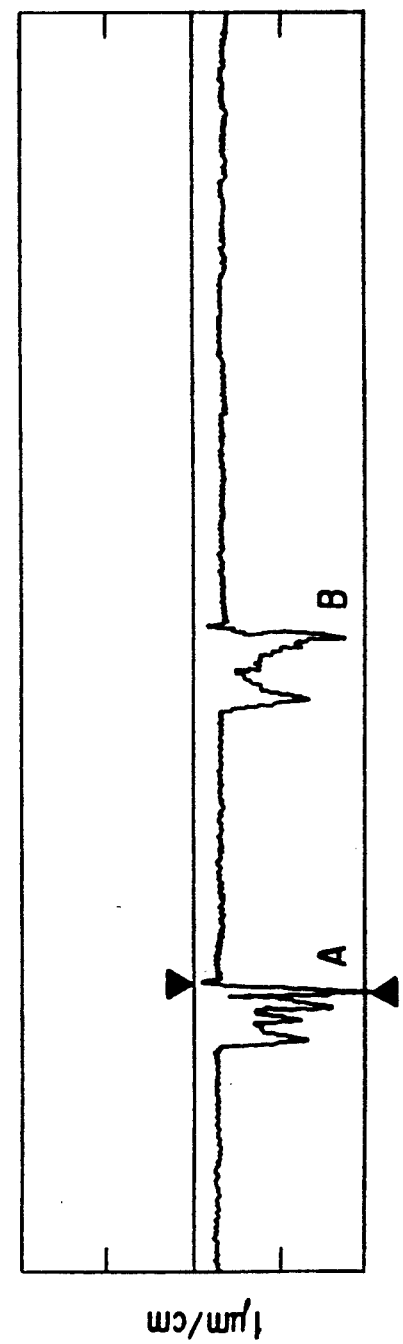

The first supporting portion 112 of the levelling apparatus 107 of this embodiment is composed of an engaging portion 170, a regulating plate 171, a rod member 172, a holding member 173, and two pairs of balls 174, 175 and 176, 177, as shown in FIG. 13.

The engaging member 170 is fixed to the back surface of the mounting member 110 by screws (not shown). The engaging member 170 is provided at the bottom portion with recessed portions (not shown) for receiving the balls 174, 175, a groove portion 178a and a female screw portion (not shown) into which the rod portion 172 is screwed.

The holding member 173 is fixed on the upper surface of the base 9 by screws. The holding member 173 is provided with a groove portion 178b for receiving the ball 176, a recessed portion 179 for receiving the ball 177 and a through hole 180 through which the rod member 172 penetrates.

The regulating plate 171 is provided with two holes 181, 182 which have a larger diameter on the upper surface of the regulating plate 171 than the diameter on the lower surface thereof, and two holes 183 and 184 which have a smaller diameter on the upper surfaces of the regulating plate 171 than the diameter on the lower surface thereof. The balls 174 and 175 are engaged with the holes 181 and 182, respectively, from the upward side but do not pass through the respective holes. On the other hand, the balls 176 and 177 are engaged with the holes 183 and 184, respectively, from the downward side but do not pass through the respective holes. At the center of the regulating plate 171 is provided a through hole 185 through which the rod member 172 penetrates.

The rod member 172 is inserted into a coil spring 186 and screwed into the female screw portion of the engaging member 170 through the through hole 180 of the holding member 173 and the through hole 185 of the regulating plate 171. Therefore, the positions of the balls 174, 175, 176 and 177 are rotatably regulated by the hole 181 of the regulating plate 171 and the recessed portion of the engaging member 170, the hole 182 of the regulating plate 171 and the groove portion 178a of the engaging member 170, the hole 183 of the regulating plate 171 and the groove portion 178b of the holding member 17, and the hole 184 of the regulating plate 171 and the recessed portion 179 of the holding member 173, respectively. The coil spring 186 applies a preload to the rod member 172.

The supporting portion 112 having the abovedescribed structure supports the mounting member 110 with respect to the base 109 in the same way as the first supporting portion 12 shown in FIG. 8 so as to be rotatable around the common axis of the balls 174 and 175 (in the direction indicated by the arrow A) and around the common axis of the balls 176 and 177 (in the direction indicated by the arrow B).

Since the positions of the balls 174 to 177 are regulated, the mounting member 110 does not rotate around the rod member 172 with respect to the base 109.

In FIG. 8, the rotary member 20 of the levelling apparatus 7 is composed of two rods having the same diameter and orthogonal to each other. Alternatively, the rotary member 20 may be constituted by a combination of two rods having different diameters or by a pair of rods arranged so as to be orthogonal to each other through an intermediate member.

As described above, according to these embodiments, three supporting portions are arranged between the base and the mounting member. Two of the three supporting portions make the space between the base and the mounting plate variable and the other supporting portion 112 makes the base and the mounting member relatively rotatable around the axes which do not coincide with the line connecting two portions for supporting the base and the mounting member and which are orthogonal to each other. As a result, when the inclination of the mounting member is corrected (attitude is controlled) with respect to the base, the base and the mounting member do not relatively rotate around the lines connecting two portions for supporting the base and the mounting member.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A levelling apparatus comprising:
   a mounting member for mounting an object thereon;
   a supporting means for supporting said mounting member in such a manner as to have a variable inclination with respect to a base, wherein said supporting means includes three supporting portions which are disposed between said base and said mounting member and not on the same straight line;
   a first supporting portion supporting said base and said mounting member with a substantially constant space therebetween and allowing the spatial rotation of said mounting member without rotation around an axis which is vertical to said base; and
   second and third supporting portions supporting said base and said mounting member with a variable space therebetween; and
   a control means for obtaining the average plane of a surface of said object placed on said mounting member from the coordinates of at least three points in a specified area of the object which are not on the same straight line and for issuing signals to said supporting means to control said average plane so as to have a desired attitude.

2. A levelling apparatus according to claim 1, wherein said second and third supporting portions are disposed at the vertices of the base of an isosceles triangle with said first supporting portion as the apex; and
   said control means obtains the displacement $\Delta Z_p$ of the space between said base and said mounting member at said second supporting portion and the displacement $\Delta Z_q$ of the space between said base and said mounting member at said third supporting portion from the following equations:

$$\Delta Z_p = \lambda X_o - \mu Y_o$$

$$\Delta Z_q = \lambda X_o + \mu Y_o$$

wherein ($\lambda$, $\mu$, $\nu$) represents the direction cosine vector of the average plane of said object placed on said mounting member, $X_o$ the distance of the perpendicular between said first supporting portion and the straight line connecting said second and third supporting portions, and $Y_o$ half the distance between said second supporting portion and said third supporting portion.

3. A levelling apparatus according to claim 1, wherein said first supporting portion of said supporting means is provided with two pairs of balls which provide rotation of the mounting member about only two respective axes, which axes do not coincide with a line connecting the second or third supporting portions for supporting said base and said mounting member and the first supporting portion and which axes are orthogonal to each other.

4. A levelling apparatus according to claim 1, wherein said first supporting portion of said supporting means is provided with two pairs of axial bodies which provide rotation of the mounting member about only two respective axes, which axes do not coincide with a line connecting the second or third supporting portions for supporting said base and said mounting member and the first supporting portion and which axes are orthogonal to each other.

5. A levelling method comprising:
an average plane detecting step for detecting the average plane of an object placed on a mounting member; and
a position controlling step for controlling supporting means for supporting the mounting member so that the direction cosine vector of the average plane is coincident with a desired cosine vector, wherein said supporting means includes first, second and third supporting portions;
said second and third supporting portions are disposed at the vertices of the base of an isosceles triangle with said first supporting portion as the apex; and
said control means obtains the displacement $\Delta Z_p$ of the space between said base and said mounting member at said second supporting portion and the displacement $\Delta Z_q$ of the space between said base and said mounting member at said third supporting portion from the following equations:

$$\Delta Z_p = \lambda X_o - \mu Y_o$$

$$\Delta Z_q = \lambda X_o + \mu Y_o$$

wherein ($\lambda$, $\mu$, $\nu$) represents the direction cosine vector of the average plane of said object placed on said mounting member, $X_o$ the distance of the perpendicular between said first supporting portion and the straight line connecting said second and third supporting portions, and $Y_o$ half the distance between said second supporting portion and said third supporting portion.

* * * * *